US008628668B2

(12) United States Patent
Simonson

(10) Patent No.: US 8,628,668 B2
(45) Date of Patent: Jan. 14, 2014

(54) PIPELINE MAGNETIC SEPARATOR SYSTEM

(76) Inventor: Roger M. Simonson, Calgary (CA)

( * ) Notice: Subject to any disclaimer, the term of this patent is extended or adjusted under 35 U.S.C. 154(b) by 423 days.

(21) Appl. No.: 12/992,855

(22) PCT Filed: May 13, 2009

(86) PCT No.: PCT/CA2009/000662
§ 371 (c)(1),
(2), (4) Date: Feb. 11, 2011

(87) PCT Pub. No.: WO2009/137930
PCT Pub. Date: Nov. 19, 2009

(65) Prior Publication Data
US 2011/0139722 A1 Jun. 16, 2011

Related U.S. Application Data

(60) Provisional application No. 61/052,910, filed on May 13, 2008.

(51) Int. Cl.
*F16L 55/24* (2006.01)
*B03C 1/28* (2006.01)
*B01D 21/26* (2006.01)

(52) U.S. Cl.
USPC ............................ 210/695; 210/222; 209/229

(58) Field of Classification Search
USPC ........................... 210/222, 223, 695; 209/229
See application file for complete search history.

(56) References Cited

U.S. PATENT DOCUMENTS

| | | | |
|---|---|---|---|
| 5,188,239 A | 2/1993 | Stowe |
| 6,638,425 B2 | 10/2003 | Asterlin |
| 6,833,069 B1 | 12/2004 | Asterlin |
| 2006/0006106 A1 | 1/2006 | White |
| 2010/0155336 A1 | 6/2010 | Simonson |

FOREIGN PATENT DOCUMENTS

| | | |
|---|---|---|
| CA | 2331559 A1 | 7/2002 |
| CN | 201020321 Y | 2/2008 |
| JP | 62087217 A | 4/1987 |
| JP | 11244626 A | 9/1999 |
| RU | 2196634 C1 | 1/2003 |
| WO | WO 2008/101352 | 8/2008 |

OTHER PUBLICATIONS

International Preliminary Report on Patentability for PCT/CA09/00662, Nov. 17, 2010.*

* cited by examiner

*Primary Examiner* — David A Reifsnyder
(74) *Attorney, Agent, or Firm* — Bennett Jones LLP

(57) ABSTRACT

A system, apparatus and method for magnetically separating a fluid flow passing through a pipeline are provided. A magnetic separator assembly having a plurality of elongate magnetic members is provided. Each magnetic member can have a first end and a second end. A cleaner plate can be provided that can move along the magnetic members. After the magnetic separator assembly is used to collect magnetic particles from a fluid flow in a pipeline, the magnetic separator assembly can be cleaned by sliding the cleaning plate along the magnetic members.

25 Claims, 4 Drawing Sheets

PIPELINE MAGNETIC SEPARATOR SYSTEM

The invention relates to pipeline separators using magnetic forces.

BACKGROUND OF THE INVENTION

In the oil and gas industry throughout the world, hydrocarbon fluids, natural gas and methane are conveyed through transmission pipeline systems. The majority of such pipelines are manufactured with ferrous steel. Black powder is a problem with these oil and gas pipelines. These pipelines typically wear from the inside from corrosion and erosion and the operational life of a pipeline is directly correlated to the quality of the iron used and the quality of the manufacturing process. This corrosion and erosion causes the formation of black powder in the pipeline. Black powder typically consists of various forms of iron sulfide and/or iron oxide and can also consist of some portion of silica dust and other materials. The higher the quality of material and production capability the longer the pipeline will last. Lower grade material and production will result in higher amounts of black power forming and significantly reduced operational life.

Pipeline erosion is a serious problem. Some main causes of pipeline erosion include: the flow of gas or hydro carbon fluids creates friction through contact resulting in very fine particles (the black powder) down to and below 10 microns in size to be eroded from the pipe wall, then enter and suspend in the flow; the increase of the ferrous contamination (black powder) levels as the gas or hydrocarbon fluid travels along the pipeline system are directly correlated with the distance traveled and pipe quality; as the level of ferrous contamination suspended in the gas and or hydrocarbon fluid increases the opportunity and ability to erode the pipe wall increases significantly, which is due to the hardness factor of the ferrous contamination suspended in the flow.

Corrosion is another serious problem for pipelines. Moisture will accumulate as the temperature and humidity rise and fall. The moisture will oxidize the ferrous metal creating scaling on the surface of the pipe wall. The flow of the gas or hydrocarbon fluids break away the scale with the assistance of the fine ferrous contamination already suspended in the flow forming black powder traveling through the pipeline.

Again, the mitigating factor to the wear ratio is the quality of pipe and the distance traveled and the ferrous and non ferrous (silica sand) contamination suspended in the flow.

The ferrous contamination (black powder) created by the transmission process creates additional serious operational problems with the process of transporting the gas or hydrocarbon fluid though the transmission line and can directly affect the quality of the medium flowing through the pipeline A number of problems can arise from ferrous contamination: the gas and or hydrocarbon fluid quality can be degraded due to the level of ferrous contamination; the ferrous contamination can prematurely wear the meter gauges and in some cases plug the meter creating a serious issue of flow volume accuracy; the fine ferrous contamination can enter and settle in the flow control valves causing them to fail; the ferrous metal can prematurely wear pump, compressor and turbine components along the transmission lines; the ferrous metal contamination can cause a multitude of problems when the gas and or hydrocarbon fluid enters the refining process from pump and pipe wear to contamination of the by-product separation and production processes; and when the gas or hydrocarbon fluid is warehoused in ferrous steel reservoirs, it again is subject to ferrous metal contamination from corrosion.

One solution is to remove the ferrous contamination from as many opportune locations as possible along the pipeline system to reduce the accumulating negative impact it has on the pipeline, associated rotating equipment and metering gauges. However, traditional filtration technology, such as cyclone or centrifuge filters and media filters employed to date have proven to be expensive. They can also be inefficient and create flow restrictions. In some cases they can even collapse from back pressure created when they become plugged.

SUMMARY OF THE INVENTION

In a first aspect, a system for magnetically separating a fluid flow passing through a pipeline. The system having a housing for connection inline with the pipeline and defining an internal flow path for the fluid flow passing through the pipeline to pass through the housing, the housing having an aperture in fluid communication with the flow path; and a magnetic separator assembly having a header and a plurality of magnetic members, each of the magnetic members attached to the header at a first end and extending away from the header to a second end. The aperture is positioned in the housing such that the magnetic separator assembly can be installed in the aperture with the magnetic members extending at least partially into the flow path.

In a second aspect, an apparatus for cleaning a magnetic separator assembly is provided wherein the magnetic separator has a plurality of magnetic members and a cleaning plate, each of the magnetic members attached to the header at a first end and extending away from the header to a second end and the cleaning plate having a plurality of apertures passing through the cleaning plate, the apertures in the cleaning plate positioned to correspond with the magnetic members of the magnetic separator device so that the magnetic members can slide through the apertures in the cleaning plate and the cleaning plate can be slid from a second end of the magnetic members to a first end of the magnetic members. The apparatus has a housing sized to accept the magnetic members of the magnetic separator assembly and a fastening device proximate an end of the housing for releasably attaching to the cleaning plate.

In a third aspect, a method for cleaning a magnetic separator assembly is provided. The method comprises providing a magnetic separator assembly having a plurality of elongate magnetic members, each magnetic member having a first end and a second end, providing a cleaner plate proximate the first ends of the magnetic members, the cleaner plate having a plurality of apertures corresponding to the magnetic members so that the magnetic members can extend through the cleaner plate and the cleaner plate can slide along lengths of the magnetic members, using the magnetic separator assembly to collect magnetic particles from a fluid flow in a pipeline and after the magnetic separator assembly has been used to collect magnetic particles from the fluid flow in the pipeline, cleaning the magnetic separator assembly by sliding the cleaning plate from proximate the first ends of the magnetic members towards the second ends of the magnetic members.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
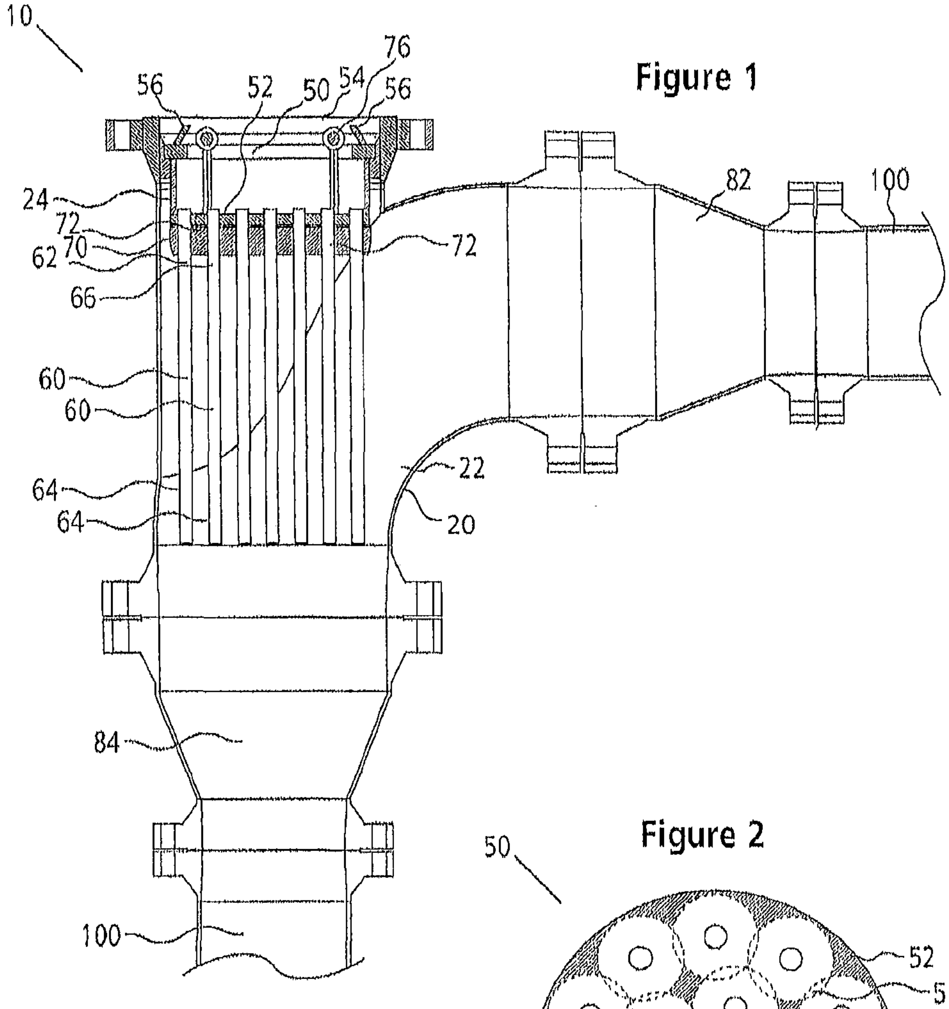
FIG. 1 is a schematic elevation illustration of a separator housing installed in a pipeline with a separating assembly installed therein.

FIG. 1 illustrates a magnetic separation system 10 in one aspect. The magnetic separation system 10 employs powerful magnets to remove particles of magnetic material, such as ferrous particles, from a fluid flow, such as an oil or gas flow, passing through a pipeline 100. The magnetic separation system 10 can have a magnetic separator assembly 50 that is installable in a housing 20 and allows full exposure to a fluid flow passing through the pipeline 100, such as gas or hydrocarbon fluids, without significantly impeding the fluid flow and is capable of extracting and holding large volumes of ferrous metal contamination.

The housing 20 is connected inline of the pipeline 100 and defines a flow path 22 through which a fluid flow passing through the pipeline 100 can pass through the housing 20. An aperture 24 can be provided in the housing 20 in fluid communication with the flow path 22.

Figure 2:
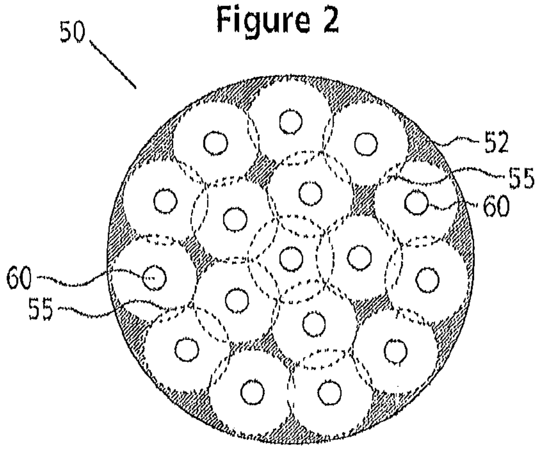
FIG. 2 is a bottom plan view of a magnet separator assembly showing the arrangement of magnetic members.
Figure 3:
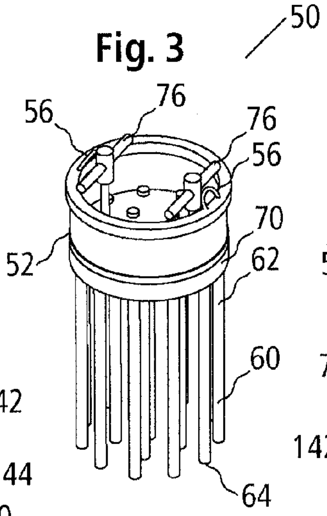
FIG. 3 is a perspective view of a magnetic separator assembly.

FIG. 3 illustrates the magnetic separator assembly 50 in one aspect. The magnetic separator assembly 50 can have a header 52 that is attached to a blind flange 54. A number of elongate magnetic members 60 having first ends 62 and second ends 64 can be attached to the header 52 at their first ends 62 such that the magnetic members 60 extend away from the header 52 towards their second end 64. Each of the magnetic members 60 is a powerful magnet to attract metallic materials to the magnetic members 60. Referring to FIG. 2, the magnetic members 60 can be attached to the header 52 such that they are spaced across the header 52. In this manner, magnetic fields 55 generated by the magnetic members 60 can be made to border each other and even overlap. In one aspect, the magnetic members 60 can be attached to the header 52 so that they form a number of concentric circles.

Referring to FIGS. 1 and 3, a cleaning plate 70 can be provided. The cleaning plate 70 can be sized to substantially match the size of the header 52. A plurality of apertures 72 can be provided extending spaced throughout the cleaning plate 70 and extending through the cleaning plate 70. The apertures 72 are spaced on the cleaning plate 70 to correspond to the locations of the magnetic members 60 extending from the header 52, so that the cleaning plate 70 can be positioned at the second ends 64 of the magnetic members 60 and the apertures 72 in the cleaning plate 70 aligned with the magnetic members 60. With the apertures 72 in the cleaning plate 70 aligned with the magnetic members 60, the magnetic members 60 can be slid through the apertures 72 and the cleaning plate 70 can thereby be slid from the second ends 64 of the magnetic members 60 along the length of the magnetic members 60 towards the first ends 62 of the magnetic members 60 until the cleaning plate 70 is positioned substantially adjacent to the header 52. In one aspect, the cleaning plate 70 and the header 52 can be connectable so that the cleaning plate 70 can be secured adjacent the header 52 while in position in the housing 20 or during moving of the magnetic separator assembly 50 such as by fasteners 76.

In operation, the magnetic separator device 50 can be installed in the aperture 24 in the housing 20 with the second ends 72 of the magnetic members 60 extending into the flow path 22 defined by the housing 20. While a fluid flow is being transported through the pipeline 100 and through the flow path 22 defined by the housing 20 the fluid flow can pass between the magnetic members 60 of the magnetic separator assembly 50 that are extending into the flow path 22. Magnetic material, such as ferrous particles, present in the fluid flow and passing between the magnetic members 60 can be magnetically attracted to the magnetic members 60 and can attach themselves to the magnetic members 60, thereby removing these particles from the fluid flow. As fluid continues to pass through the flow path 22 defined by the housing 20 and past the magnetic members 60 of the magnetic separator assembly 50, more and more particles of metallic material can be removed from the fluid flow.

Due to the high flow rate and volume of fluid that can be transmitted through gas pipelines and the high viscosity oil transmitted through oil pipelines, very large magnetic separators with powerful magnetic fields may be required to be employed to realize efficient separation.

Static electricity, although often undesirable, is sometimes present in oil and gas pipelines. In some cases, non-ferrous or normally non-magnetic materials may be given a static charge in these pipelines and this static charge can cause the magnetic separation system 10 to attract some of the statically charged non-ferrous materials and remove them from the flow through the pipeline in addition to the particles of magnetic material, such a ferrous particles.

A flow in a pipeline with a static charge may have the static charge reduced as a result of contact with the magnetic separation system 10.

In a further aspect, the flow path 22 defined by the housing 20 may be larger in diameter than the pipeline 100 for the purpose of creating a larger volume for the gas or fluid passing through the pipeline 100 to expand into thereby slowing down the flow of the fluid while the fluid is passing through the flow path 22 in the housing 20 and exposed to the magnetic members 60 of the magnetic separator assembly 50. A housing 20 defining a flow path 22 having a diameter with an increase of ⅓ over the size of the diameter of the pipeline 100 may be useful for example. In one aspect, this can be accomplished by employing a generally conical inlet 82 and a generally conical outlet 84 on either side of the housing 20 to compensate for the greater diameter of the flow path 22. Such inlet 82 and outlet 84 form an expander from the pipeline 100 expanding to meet the larger diameter of the flow path 22 in the housing 20 and a reducer, reducing to once again correspond with the diameter of the pipeline 100, respectively.

The size and strength of such magnetic separator assemblies 50 can create an environment that may become dangerous for technicians to handle by hand for cleaning and the weight of each magnetic separator assembly 50 can exceed the weight requirements for human handling. Also, the magnetic field strength of each magnetic separator assembly 50 may cause injury if the technician comes between the magnetic separator assembly 50 and a ferrous metal structure.

Figure 6:
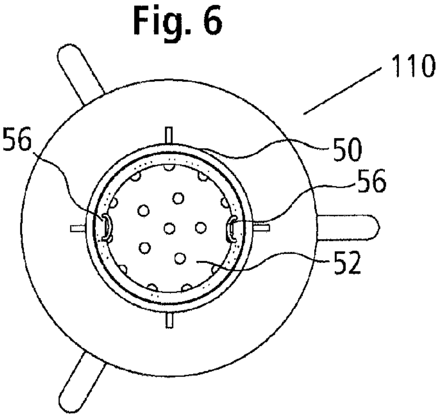
FIG. 6 is a top plan view of the system of FIG. 4.
Figure 5:
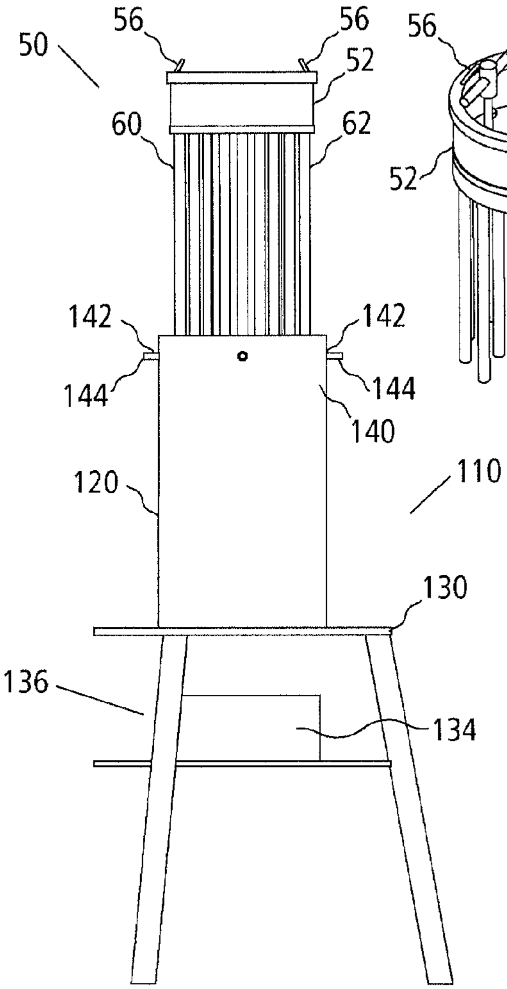
FIG. 5 is a side elevation of the system of FIG. 4.
Figure 4:
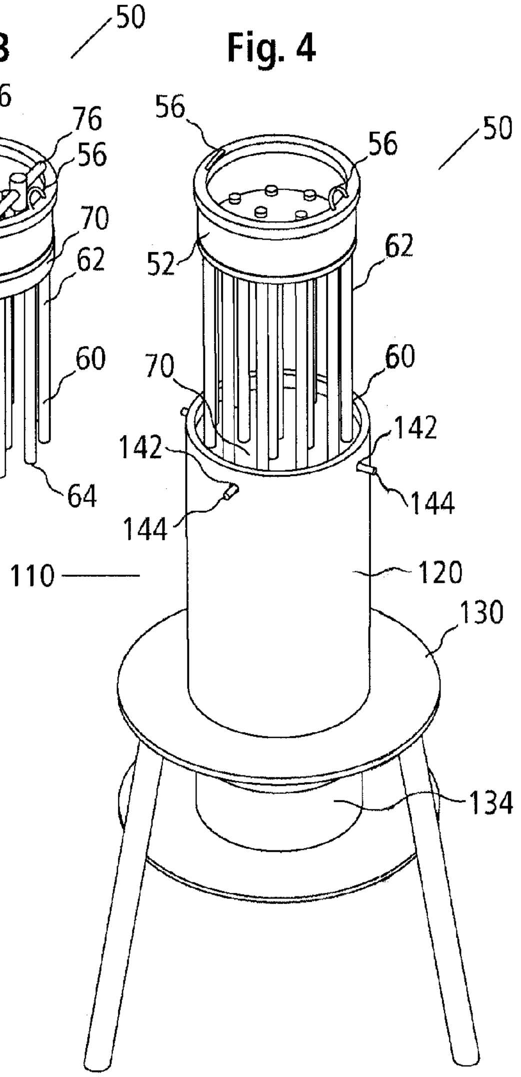
FIG. 4 is a perspective view of a clean out canister and a magnetic separator assembly being cleaned therein.
Figure 7:
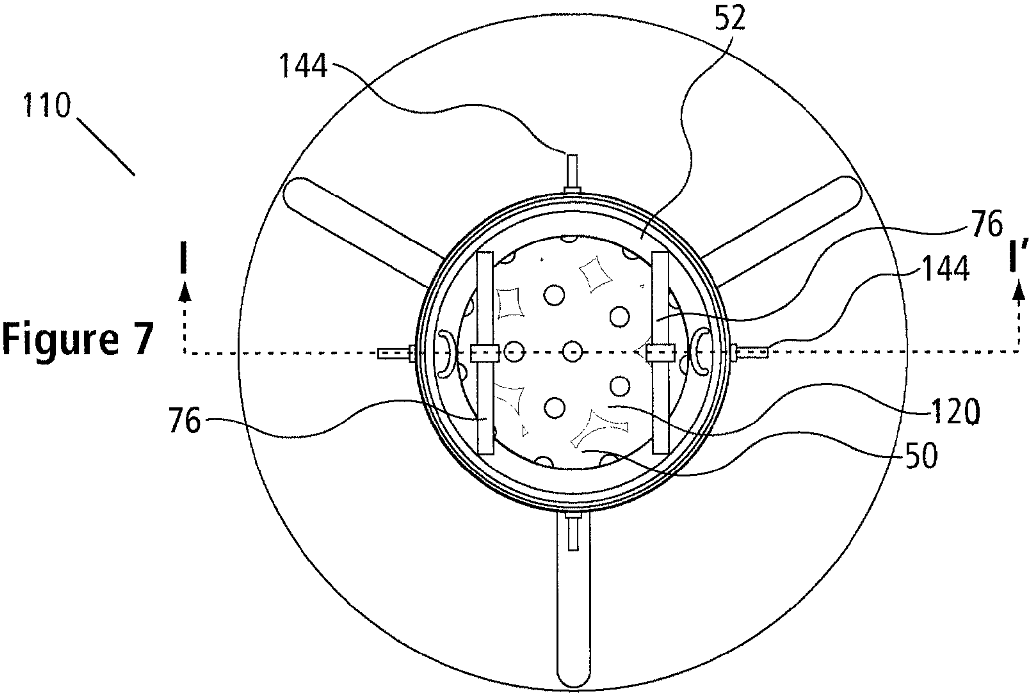
FIG. 7 is a top plan view of a clean out canister with a magnetic separator assembly installed therein.
Figure 8:
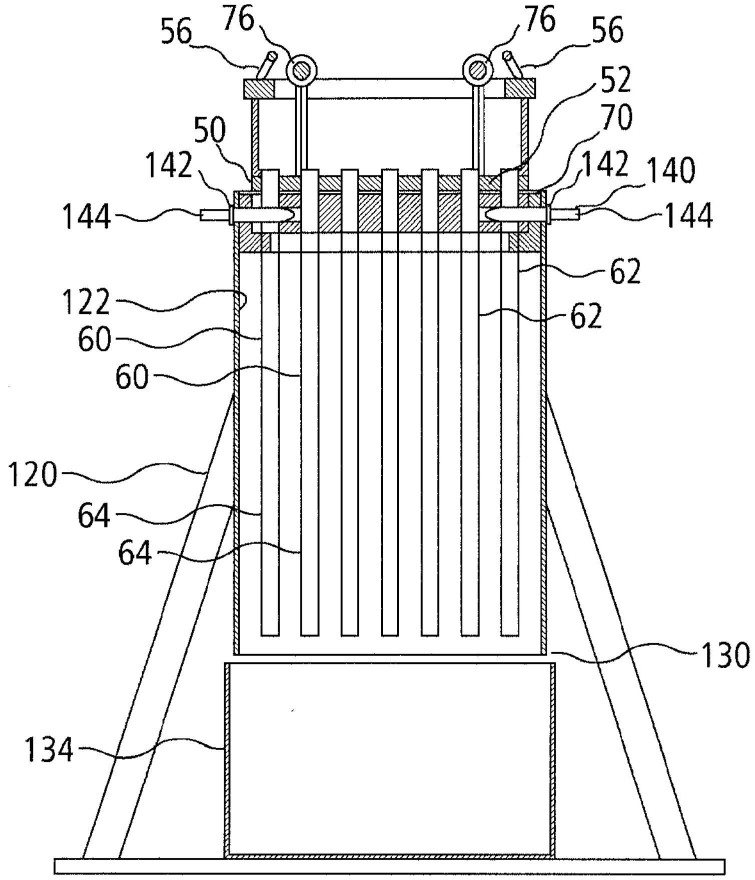
FIG. 8 is a sectional view along line I-I of FIG. 7.

FIGS. 4 through 6 illustrate a clean out canister 110 in one aspect for cleaning metallic particles that have adhered to the magnetic separator assembly 50.

The clean out canister 110 has a housing 120 defining a cavity 122 sized to accept the magnetic members 60 of the magnetic separator assembly 50. The housing 120 can be supported on a structural base plate 130. Below the housing 120 and the structural base plate 130, a collector 134 can be provided. A hinged clean out flange 136 can be provided to allow access to the collector 134.

A fastening device 140 can be provided proximate a top end of the housing 120 of the clean out canister 110 to secure the cleaning plate 70 in place relative to the housing 120 of the clean out canister 110. In one aspect, the fastening device 140 can be a series of apertures 142 provided in the housing 120 and corresponding retaining pins 144. Although many locations are possible, retaining pins 144 can be carried on the clean out canister 110 or magnetic separator assembly 50.

To clean the magnetic separator assembly 50 the top blind flange 54 can be unbolted and removed from over top of the aperture 24 in the housing 20, for example with a lifting crane (not shown). The crane can be attached by lift hooks 56 to the header 52 of the magnetic separator assembly 50 and the magnetic separator assembly 50 lifted out of the housing 20 through the aperture 24 and moved over to and lowered into the clean out canister 110 to remove magnetic particles that have become attached to the magnetic members 60 of the magnetic separator assembly 50 as a result of magnetic force.

Once the magnetic members 60 of the magnetic separator assembly 50 are positioned in place, enclosed by the housing 20 of the clean out canister 110, the fastening device 140 can be used to secure the cleaning plate 70 to the housing 120 of the clean out canister 110. If the fastening device 140 comprises apertures 142 in the housing 120 and corresponding retaining pins 144, the retaining pins 144 can be attached through the housing 120 of the cleanout canister 110 and into the cleaning plate 70. This secures the cleaning plate 70 to the clean out canister 110. The fasteners 76, attaching the cleaning plate 70 adjacent to the header 52 can be removed to allow the cleaning plate 70 to separate from the remainder of the magnetic separator assembly 50. The fastener 76 may also serve as the retaining pins 144, if desired. The crane may then be employed to lift the magnetic separator assembly 50 to the required height pulling the magnetic separator members 50 through the apertures 72 in the cleaning plate 70 causing the cleaning plate 70, which is being held in place by the clean out canister 110, to slide from the first ends 62 of the magnetic members 60 to the second ends 64 of the magnetic members 60, thereby scraping off particles of magnetic material that have collected on the magnetic members 60. The particles of magnetic materials (or contaminants), once forced from the magnetic members 60, may drop down into the bottom of the clean out canister 110 and into the collector 134 therebelow. In one aspect, the collector 134 can be a containment bag enclosed around the bottom of the housing 120 of the clean out canister 110. In another embodiment, the clean out canister 110 can include a collector pan positionable therebelow.

Once the separator members 60 are pulled up through the cleaning plate 70 to clean them, the header 52 may be dropped back into place and the cleaning plate 70 may be reattached to the header 52. The whole magnetic separator assembly 50 can then be returned to the housing 20 provided inline with the pipeline 100 and secured and ready for service. This operation can be executed by an external crane or an attached dedicated crane system (not shown).

This design allows minimal human contact to the magnetic separation system 10 and no exposure to the magnetic fields or the contamination. The ferrous contamination can be removed in a secure sealed mineral bag designed to handle the weight and type of contamination.

In one aspect, the magnetic separation system 10 can be designed for but not limited to pipelines from 12" to 48" in diameter and the housing 20 may, in one embodiment, house up to forty (40) magnetic members 60. While various sizes and ratings are useful, in one embodiment, each magnetic member 60 may be for example 2" diameter and 6 feet in length and each may weigh approximately 80 lbs with the holding capacity in excess of 200 lbs.

All the material used to fabricate the housing 20, the clean out canister 110 and other components can be made from non-magnetically attractants such as of polymers or 316 Stainless Steel construction. The piping and valves for the system attached to the housing 20 can be fabricated with magnetically attractant or non-magnetically attractant materials such as carbon or stainless steel or polymers.

The self cleaning part of the design can significantly reduce any human contact with the magnetic fields and the contamination is safely contained and removed from the site. There may be no environmental issues with disposal of filter media containing contamination. This design has no disassembling and/or hands on cleaning as a centrifuge filter system placing the technician in direct contact with the contamination.

Figure 9:
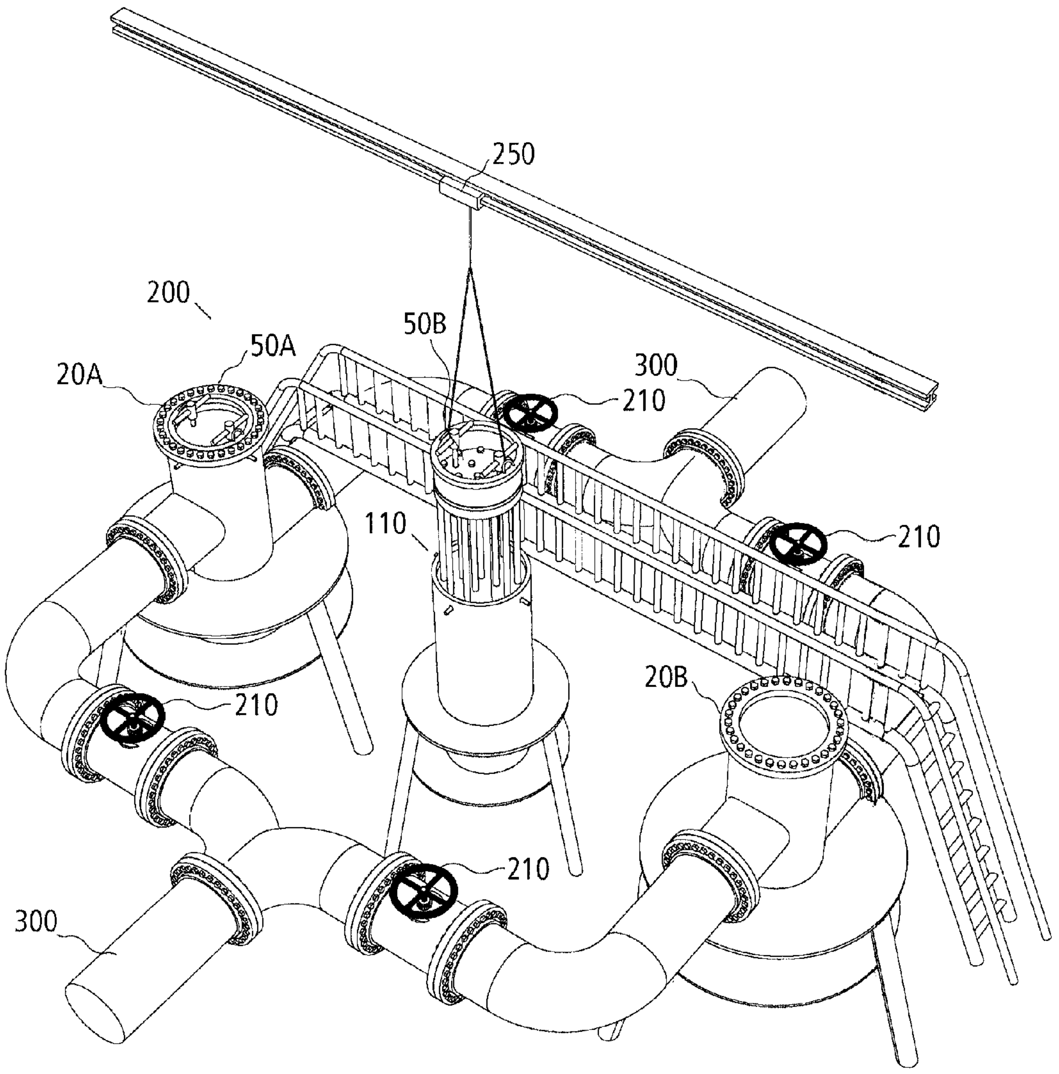
FIG. 9 is a perspective view of a duplex separator system.

FIG. 9 illustrates a duplex separator system 200 that is employed to allow continuous operation of a pipeline 300 even during removal of the magnetic separator assembly 50 for cleaning. The duplex separator system 200 has a first housing 20A, a first magnetic separator assembly 50A, a second housing 20B, a second magnetic separator assembly 50B and a clean out canister 110. A fluid flow passing through the pipeline 300 can be routed through either the first housing 20A containing the first magnetic separator assembly 50A or the second housing 20B containing the second magnetic separator assembly 50B. A series of valves 210 allow the selective routing of the flow of fluid through the first housing 20A and the first magnetic separator assembly 50A and/or the second housing 20B and the second magnetic separator assembly 50B. A crane 250 can be provided for moving the magnetic separator assemblies 50A, 50B.

The duplex separator system 200 allows the a flow of fluid being routed through the pipeline 300 to be routed through one of the housings 20A, 20B and the corresponding magnetic separator assembly 50A, 50B while the other is being cleaned. For example, FIG. 9 shows the second magnetic separator assembly 50B being cleaned using the clean out canister 110 and the crane 250 while the flow is routed through the first housing 20A and first magnetic separator assembly 50A. In this manner, the fluid flow passing through the pipeline 300 can be maintained while one of the magnetic separator assemblies 50A, 50B is being cleaned, avoiding having to shut down the entire pipeline 300.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A system for magnetically separating magnetic particles in a fluid flow passing through a pipeline, the system comprising:

a housing for connection inline with the pipeline and defining an internal flow path for the fluid flow passing through the pipeline to pass through the housing, the housing having an aperture in fluid communication with the flow path;

a magnetic separator assembly having a header and at least one magnetic member, the at least one magnetic member being attached to the header at a first end and extending away from the header to a second end, the magnetic separator assembly being installable in the aperture with the at least one magnetic member extending at least partially into the flow path; and a cleaning plate having at least one aperture passing therethrough, the at least one magnetic member being slideable through the at least one aperture, the cleaning plate being slideable between proximate the first end and proximate the second end of the at least one magnetic member, and the cleaning plate being releasably connected to the header.

2. The system of claim 1 wherein the flow path defined by the housing has a larger diameter than a diameter of the pipeline.

3. The system of claim 2 wherein the flow path defined by the housing has a diameter at least one third larger than a diameter of the pipeline.

4. The system of claim 2 wherein the housing has a conically shaped inlet and a conically shaped outlet to connect the housing inline with the pipeline.

5. The system of claim 1 further comprising a clean out canister, the clean out canister having:

a canister housing sized to receive the at least one magnetic member; and a fastening device proximate an end of the canister housing for releasably attaching to the cleaning plate.

6. The system of claim 5 wherein the clean out canister further comprises a collector for collecting magnetic particles removed by the cleaning plate.

7. The system of claim 6 wherein the fastening device comprises a plurality of apertures located proximate a top end of the canister housing and a plurality of retaining pins.

8. The system of claim 6 wherein the collector comprises a containment bag enclosed around the bottom of the canister housing.

9. The system of claim 8 wherein the containment bag is a mineral bag.

10. The system of claim 1 wherein the cleaning plate is connected to the header by fasteners.

11. An apparatus for cleaning a magnetic separator assembly, the magnetic separator assembly having a header, a plurality of magnetic members and a cleaning plate, each of the magnetic members attached to the header at a first end and extending away from the header to a second end, and the cleaning plate having a plurality of apertures passing therethrough, the magnetic members being slideable through the plurality of apertures, the cleaning plate being slideable between proximate the first end and proximate the second end of the magnetic members, and the cleaning plate being releasably connected to the header, the apparatus comprising:

a housing sized to receive the magnetic members; and a fastening device releasably attachable to the cleaning plate for maintaining the cleaning plate in a stationary position relative to the housing.

12. The apparatus of claim 11 further comprising a collector for collecting contaminants removed by the cleaning plate.

13. The apparatus of claim 12 wherein the collector comprises a containment bag enclosed around the bottom of the housing.

14. The apparatus of claim 11 wherein the fastening device comprises a plurality of apertures located proximate a top end of the housing and a plurality of retaining pins.

15. The apparatus of claim 11 wherein the stationary position is proximate a top end of the housing.

16. A method for cleaning a magnetic separator assembly usable for collecting magnetic particles from a fluid flow, the magnetic separator assembly comprising a plurality of elongate magnetic members, a header, and a cleaning plate, each magnetic member having a first end and a second end and being connected to the header at the first end, the cleaning plate having a plurality of apertures through which the magnetic members are extendable and slideable between about the first end and about the second end, and the cleaning plate being releasably fastened to the header proximate the first end, the method comprising:

inserting the plurality of elongate magnetic members into a canister, the canister having a canister housing for receiving at least a lengthwise portion of the magnetic members;

securing the cleaning plate to the canister housing to maintain the cleaning plate in a stationary position relative to the canister housing;

releasing the cleaning plate from the header; and sliding the magnetic members relative to the canister housing, through the plurality of apertures in the cleaning plate, from about the first end towards the second end.

17. The method of claim 16 further comprising extracting the magnetic members from the canister by sliding the magnetic members until the second end passes through the plurality of apertures in the cleaning plate.

18. The method of claim 16 wherein the stationary position is proximate a top end of the canister.

19. The method of claim 16 wherein the canister further comprises a collector at a bottom end of the canister, and further comprising collecting magnetic particles in the collector.

20. The method of claim 19 wherein the collector is a containment bag enclosed around the bottom end of the canister.

21. A method for separating magnetic particles in a substantially continuous fluid flow through a pipeline comprising:

passing the fluid flow through a first housing containing a first magnetic separator assembly while bypassing a second housing containing a second magnetic separator assembly;

removing the second magnetic separator assembly from the second housing;

removing magnetic particles from the second magnetic separator assembly;

returning the second magnetic separator assembly to the second housing; and directing the fluid flow through the second housing and bypassing the first housing.

22. The method of claim 21 further comprising removing the first magnetic separator assembly from the first housing; removing magnetic particles from the first magnetic separator assembly; and returning the first magnetic separator assembly to the first housing.

23. The method of claim 21 wherein each magnetic separator assembly comprises a header, a plurality of magnetic members and a cleaning plate, each of the magnetic members being attached to the header at a first end and extending away from the header to a second end, and the cleaning plate having a plurality of apertures passing therethrough, the magnetic members being slideable through the plurality of apertures, the cleaning plate being slideable between proximate the first end and proximate the second end of the magnetic members, and the cleaning plate being releasably connected to the header; wherein the magnetic particles are removed using a clean out canister, the clean out canister having a canister housing sized to receive the plurality of magnetic members and a fastening device proximate an end of the canister housing, the fastening device for releasably attaching to the cleaning plate; and wherein removing magnetic particles comprises inserting the plurality of magnetic members into the canister housing, attaching the cleaning plate to the fastening device, releasing the cleaning plate from the header, and sliding the plurality of magnetic members through the plurality of apertures in the cleaning plate.

24. The method of claim 23 further comprising reattaching the cleaning plate to the header.

25. The method of claim 21 wherein the second magnetic separator assembly is removed from the second housing and returned to the second housing by a crane.

* * * * *